Jan. 15, 1929.  B. CORONA  1,699,225

TIRE FOR VEHICLES

Filed Sept. 3, 1927

INVENTOR
Baldomero Corona
BY
ATTORNEY

Patented Jan. 15, 1929.

1,699,225

UNITED STATES PATENT OFFICE.

BALDOMERO CORONA, OF SANTIAGO DE CUBA, CUBA.

TIRE FOR VEHICLES.

Application filed September 3, 1927. Serial No. 217,433.

This invention relates to a new and useful device in the nature of a protector for motor vehicle tires of the pneumatic type, particularly adapted to prevent puncturing the tire to which same is attached.

The object of the invention is to provide a protector of novel construction and arrangement of parts, hereinafter more fully described, claimed and illustrated in the accompanying drawing.

Figure 1:
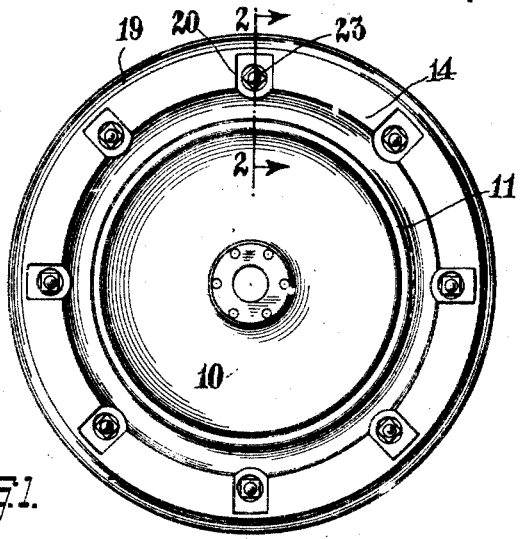
Fig. 1 is a side elevational view of a motor vehicle wheel and tire mounted thereon, equipped with my improved protector.

The motor vehicle wheel 10 provided with a rim 11, to receive the tire 12, of the pneumatic type, and the inner tube 13, positioned in the tire 12, are of ordinary construction, such as generally employed for motor vehicles. It is understood that I do not necessarily limit the use of my improved tire protector to the particular type of tire or wheel illustrated in the accompanying drawing but to all classes and types of wheels and tires as ordinarily used for motor vehicles.

As here embodied my improved tire protector comprises a rim 14, of circular ring shaped construction, adapted to engage over the above mentioned tire. The rim 14, is provided with side extended portions 15 and 16, and has attached thereto and extended outwardly therefrom a plurality of pins 17, provided with enlarged heads 18. The above described construction is such as will secure the resilient member 19, preferably of solid rubber to the rim 14. It is understood that the resilient member 19 is vulcanized, moulded, or otherwise attached thereto.

The clamping members 20, are provided with outwardly extended portions 21, adapted to engage the side extended portions 15 and 16 of the above mentioned rim 14, and are provided with inwardly projected portions 22, adapted to engage the tire 12. The clamping members 20, are provided with apertures adapted to receive the bolt 23 provided with the usual nut 24, as a means of attaching my improved protector to the tires 12.

Figure 4:
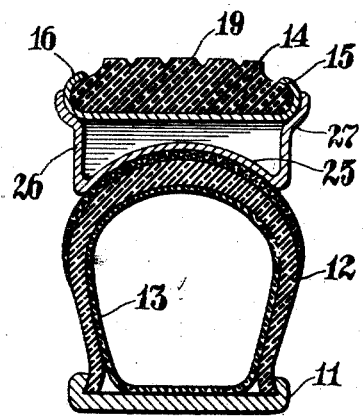
Fig. 4 is an enlarged sectional view taken on the line 4—4 of Fig. 3.

In Fig. 4 of the accompanying drawing, I have shown the extended portions 15 and 16 of the rim 14, having their extremities formed or bent inwardly, so as to engage the resilient member 19, as means of securing the resilient member 19 to the rim 14. The attaching member 25 is adapted to engage the outer surface of the above mentioned tire 12, and is of ring shaped construction, convex in cross section, so as to conform to the contour of the above mentioned outer surface of the side tire 12. The attaching member 25, is provided with side extended portions 26 and 27, adapted to engage the rim 14. The above described construction being such as will permit the attaching member 25 to be engaged over the tire 12, when uninflated, as a means of securing my improved protector to the tire 12. It is understood that the inner tube 13, will be inflated in the usual manner, after the attaching member 25 has been applied thereto.

Figure 2:
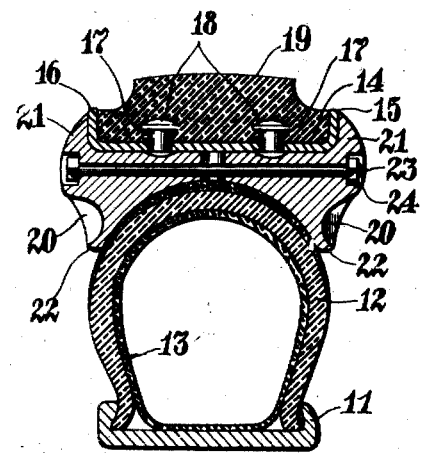
Fig. 2 is an enlarged transverse sectional view taken on the line 2—2 of Fig. 1.
Figure 3:
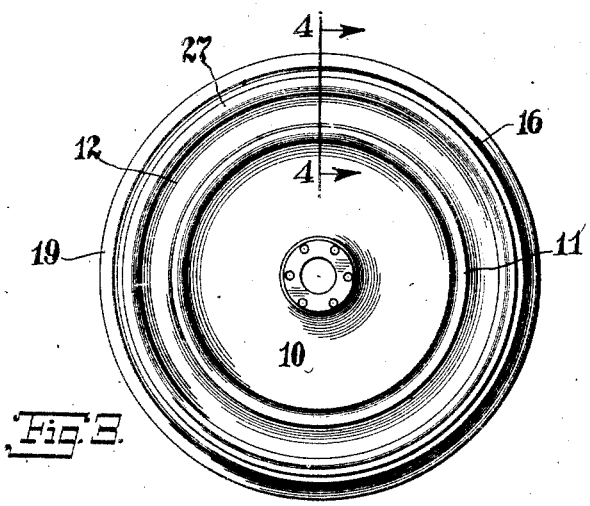
Fig. 3 is a similar view to that shown in Fig. 1 illustrating a modification of my improved protector.

It will be further understood that the resilient member 19, may be formed, moulded or otherwise shaped, so as to have any desired suitable outer, or exposed contour, so as to prevent skidding, as shown in Fig. 4, or may be constructed with a plain, smooth outer contour, as shown in Fig. 2.

Figure 5:
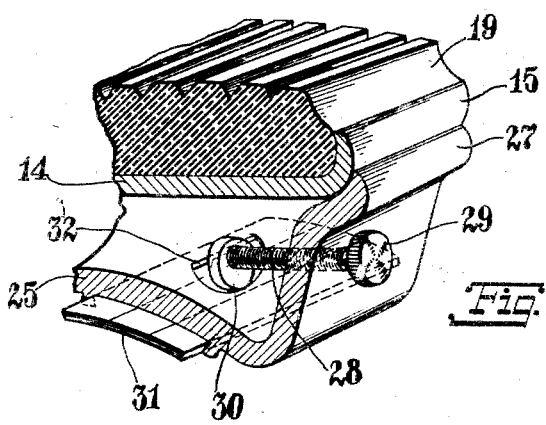
Fig. 5 is a fragmentary perspective view illustrating a further development of my improved protector.

In Fig. 5 I have shown the threaded member 28 a set screw or the like threadedly attached to the side extended portions 26 and 27. The threaded members 28, are provided with an enlarged head 29, and with a cam portion 30, or eccentric, adapted to engage the plate member 31, attached to the attaching member 25, by means of a groove provided therein, to receive the said plate member. The attaching member 25 is provided with elongated apertures 32, to permit of the engagement of the cam portion 30 with the plate member 31. The above described construction being such as will permit the plate member 31 to be forced or bent against the tire 12, so as to securely hold my improved protector in place. It is understood that the plate member 31 is of spring steel or similar material, so as to permit of the forcing or bending thereof.

Having thus described my invention, what I claim as new and desire to protect by Letters Patent of the United States is as follows:

1. In a protector of the class described, threaded members attached to an attaching member, said threaded members provided with cam portions adapted to engage a plate member attached to the said attaching member, as a means of securely holding the said protector in place on a tire.

2. In a vehicle tire, an inner pneumatic tire, a resilient plate disposed on the periphery of said pneumatic tire, an attaching member having a groove therein for accommodating said resilient plate mounted on said tire and adjustable means mounted on said attaching member and engageable with said resilient plate for deflecting a portion thereof inwardly against said pneumatic tire.

3. In a vehicle tire of the class described, a pneumatic tire casing, a resilient plate on the periphery of said casing, an attaching member comprising an annular band and outwardly disposed side flanges mounted on said casing over said plate, a plurality of screws each adjustably threaded in an aperture in one of said flanges, a cam on the inner end of each of the said screws engageable through an aperture in said band with the surface of said plate for bearing against the same to frictionally hold said attaching member on said tire in a fixed relation thereto, and a solid tire member mounted on the outer periphery of said attaching member.

4. A tire of the class described comprising an annular ring member, a plate sildably mounted on the inner periphery of said ring, and adjustable means on said ring member comprising a plurality of cams each cam engageable through an aperture in said ring with the surface of said plate for deflecting portions of said plate inwardly.

In testimony whereof I have affixed my signature.

BALDOMERO CORONA.